March 27, 1928.
G. F. SHEVLIN
VALVE
Filed March 25, 1927
1,664,270
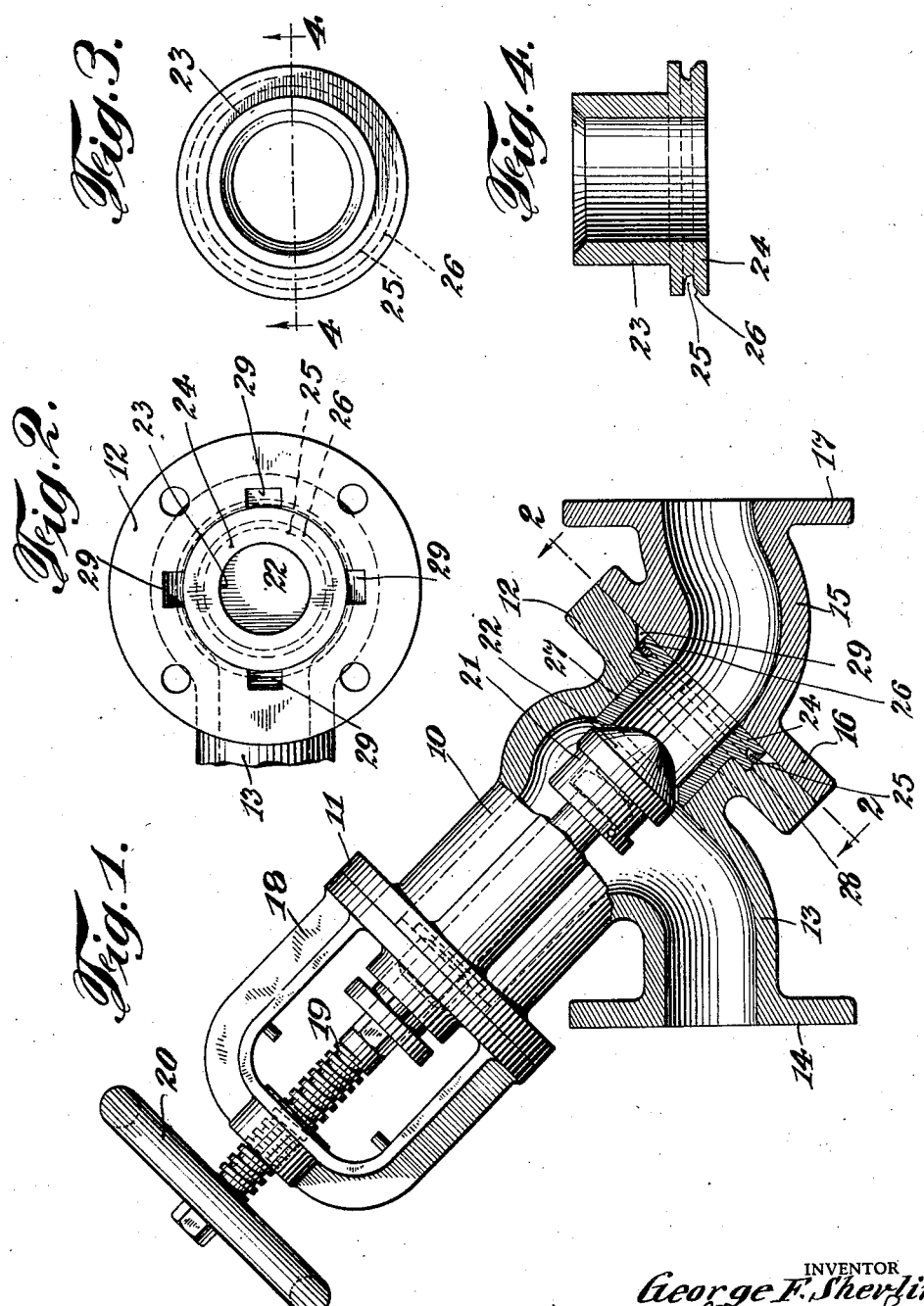
INVENTOR
George F. Shevlin
BY
his ATTORNEYS Patented Mar. 27, 1928.

1,664,270

UNITED STATES PATENT OFFICE.

GEORGE F. SHEVLIN, OF GLENS FALLS, NEW YORK, ASSIGNOR TO GEORGE F. SHEVLIN & SON, OF GLENS FALLS, NEW YORK, A PARTNERSHIP COMPOSED OF GEORGE F. SHEVLIN, SR., AND GEORGE F. SHEVLIN, JR.

VALVE.

Application filed March 25, 1927. Serial No. 178,192.

This invention relates to an improvement in valves and more particularly to that type of valves commonly employed in pipe lines in pulp mills and like places. Due to the acidity of the pulp in passing through the pipe lines in which the valves are placed, it is customary in valves of the type to which the invention relates to employ removable valve seat members and also valves which are readily renewable. As will be understood, the reason for this is that the effect of the acid on the valves and the valve seat members causes the same to pit more or less rapidly and to otherwise disintegrate, causing the valve to leak. Also in this type of valve, in some instances difficulties have been experienced in removing the valve seat members, and the object of my present invention is to overcome these difficulties.

In carrying out the invention the valve constructed in accordance therewith includes the usual valve body, a valve member, and means for operating the same, together with a removable valve seat member. This valve seat member is constructed to fit within a throat or other portion of the valve body and is preferably formed with a flange having a circumferentially disposed groove which by means of notches suitably placed in the body of the valve is accessible in the use of a chisel, screw driver or similar instrument for prying or otherwise removing the valve seat member when necessary to replace the same.

The valve made in accordance with my invention will be hereinafter more particularly described in conjunction with the accompanying drawings in which Figure 1 is an elevation and partial section of a valve in which the invention is incorporated.

Fig. 2 is a plan on line 2—2, Fig. 1.

Fig. 3 is a plan of the valve seat member, and

Fig. 4 is a section on line 4—4, Fig. 3.

As will be seen by reference to the drawing, my improved valve comprises a body member 10 made in any suitable configuration and of any desired material. At its opposite ends this valve body is provided with flanges 11 and 12. Extending from the valve body in a suitable position is a pipe connection 13 provided at its extremity with a flange 14 for attachment to a pipe line. The flange 12 is adapted to be connected to an elbow 15 or other fitting which at its extremities is flanged as indicated at 16 and 17 respectively. As illustrated, the valve is placed at an inclination in the pipe line and the connection 13 is so placed and the elbow 15 so formed that the parts of the pipe line connected to the flanges 14 and 17 are preferably in alignment, that is in the same straight line. It will be understood, however, that this form of valve construction is merely illustrative and does not go to the merits of the invention.

Also as illustrated, the valve includes a yoke member 18 suitably secured to the flange 11 and fitted with a spindle or valve stem 19 having a hand wheel 20. The valve stem 19 passes through a suitable stuffing box carried by the yoke member and extends into the valve body where interiorly thereof it is constructed to detachably receive a valve head 21 carrying a valve 22.

The invention in this case relates more particularly to the construction of the valve seat member and its relationship in the valve body whereby it may be readily removed therefrom when necessary to replace the valve seat member or otherwise. As illustrated, this valve seat member preferably comprises a cylindrical portion 23 having at one end a flange 24 in which there is a circumferentially arranged groove 25. Also as indicated, the peripheral portions of the outer face defining the groove are preferably beveled as indicated at 26. The cylindrical portion of the valve seat member is adapted to fit within the bore 27 of a neck of the valve body, and to assume a position in which the inner tapered end of the valve seat member may be readily engaged by the valve 22. The valve body is provided with a shouldered recess 28 adapted to receive the flange 24 of the valve seat member and in suitable positions the end of the valve body provided with the flange 12 is notched as indicated at 29. The number of notches as will be apparent is optional. It is preferable to employ them in oppositely disposed pairs. In the drawing two pairs or sets of these notches are illustrated as clearly seen in Fig. 2. The notches as is also clearly seen from the drawing, preferably in Fig. 1, are sufficiently deep to extend at their inner ends to the inner face defining the groove 25 in the flange of the valve seat member, and these notches are of such an extent radially as to permit the insertion of the end of a chisel or screw driver or other similar instrument after the elbow 15 has been removed to permit the use of such a tool in prying or otherwise disconnecting the valve seat member from its position in the valve. In the use of such a tool for thus purpose, as will be apparent, the end of the tool is passed into the groove 25 in the flange of the valve seat member and the inclined face of a notch 29 acts as a fulcrum, or the inclined faces of oppositely disposed notches when a pair of tools are simultaneously used from opposite sides act as fulcrums for the tool in prying the valve seat member from its seated position.

As will now be readily apparent in the use of a valve seat member and a valve as hereinbefore described, the valve seat member may be removed from its seated position in the valve when necessary in an exceedingly short time and with a minimum amount of effort.

I claim as my invention:

1. In a valve, a body having a flange, a valve, means for operating the valve, and a valve seat member comprising a cylindrical portion with a flange at one end thereof in the peripheral surface of which there is a circumferentially disposed groove the flanged portion of the valve body being recessed to receive the flange of the valve seat member in order that when in position the faces of these flanges lie in the same plane, the face of the flange of the valve body being notched to provide access for a tool to the circumferential recess in the flange of the valve seat member.

2. In a valve, a body having a flange at one end thereof, a valve, means for operating the valve, and a valve seat member comprising a cylindrical portion adapted to fit within a bore in a neck of the valve body and having a valve seat at one end thereof and a flange at the opposite end thereof, the peripheral surface of the flange of the valve seat member having a circumferentially disposed groove the flanged portion of the valve body being recessed to receive the flange of the valve seat member in order that when in position the faces of these flanges lie in the same plane and the face of the flange of the valve body having oppositely disposed notches therein providing access for a tool to the said circumferentially disposed recess in the flange of the valve seat member.

Signed by me this 16th day of March, 1927.

GEO. F. SHEVLIN.